United States Patent
Lee et al.

(10) Patent No.: US 11,457,429 B2
(45) Date of Patent: Sep. 27, 2022

(54) METHOD FOR SELECTING CARRIERS AND DEVICE SUPPORTING THE SAME

(71) Applicant: LG Electronics Inc., Seoul (KR)

(72) Inventors: Youngdae Lee, Seoul (KR); Jaewook Lee, Seoul (KR); Jongwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 30 days.

(21) Appl. No.: 16/634,080

(22) PCT Filed: Jul. 25, 2018

(86) PCT No.: PCT/KR2018/008414
§ 371 (c)(1),
(2) Date: Jan. 24, 2020

(87) PCT Pub. No.: WO2019/022504
PCT Pub. Date: Jan. 31, 2019

(65) Prior Publication Data
US 2020/0169986 A1    May 28, 2020

Related U.S. Application Data

(60) Provisional application No. 62/536,977, filed on Jul. 25, 2017.

(51) Int. Cl.
*H04W 72/02* (2009.01)
*H04L 5/00* (2006.01)
(Continued)

(52) U.S. Cl.
CPC ............ *H04W 72/02* (2013.01); *H04L 5/001* (2013.01); *H04W 72/0446* (2013.01);
(Continued)

(58) Field of Classification Search
CPC ............ H04W 4/40–46; H04W 72/02; H04W 72/042; H04W 72/0446; H04W 72/0453;
(Continued)

(56) References Cited

U.S. PATENT DOCUMENTS

2016/0316486 A1    10/2016  Bai et al.
2019/0319723 A1*   10/2019  Axmon .................. H04B 17/24
(Continued)

FOREIGN PATENT DOCUMENTS

WO    WO2016/163239    10/2016

OTHER PUBLICATIONS

Extended European Search Report in European Appln. No. 18838817.7, dated May 25, 2020, 10 pages.
(Continued)

*Primary Examiner* — Kevin C. Harper
(74) *Attorney, Agent, or Firm* — Fish & Richardson P.C.

(57) ABSTRACT

Provided are a method of selecting carriers and a device supporting the method. According to one embodiment of the present invention, a method for selecting carriers in a wireless communication system includes: receiving information on carriers and Channel Busy Ratio threshold from a network; selecting at least one carrier of which CBR value is below the CBR threshold; selecting a resource on the selected carrier; and transmitting a medium access control (MAC) packet data unit (PDU) by using the selected resource of the selected carrier.

11 Claims, 9 Drawing Sheets

(51) Int. Cl.
*H04W 72/04* (2009.01)
*H04W 72/08* (2009.01)

(52) U.S. Cl.
CPC ... *H04W 72/0453* (2013.01); *H04W 72/0486* (2013.01); *H04W 72/0493* (2013.01); *H04W 72/085* (2013.01)

(58) Field of Classification Search
CPC ......... H04W 72/0486; H04W 72/0493; H04W 72/085; H04W 72/1252; H04L 5/001
See application file for complete search history.

(56) References Cited

U.S. PATENT DOCUMENTS

| | | | | |
|---|---|---|---|---|
| 2019/0357025 | A1* | 11/2019 | Hwang | H04L 5/001 |
| 2019/0387377 | A1* | 12/2019 | Zhang | H04W 52/281 |
| 2020/0045719 | A1* | 2/2020 | Wang | H04W 72/02 |
| 2020/0178213 | A1* | 6/2020 | Xu | H04W 4/40 |

OTHER PUBLICATIONS

Guangdong OPPO Mobile Telecom, Discussion on the congestion control, R1-1611696, 3GPP TSG RAN WG1 Meeting #87, Reno, USA Nov. 14-18, 2016, 2 pages.

ZTE, Considering CA on PC5 carrier, R1-1707211, 3GPP TSG RAN WG1 Meeting #89, Hangzhou, P.R. China May 15-19, 2017, 3 pages.

3rd Generation Partnership Project; Technical Specification Group Radio Access Network, "Evolved Universal Terrestrial Radio Access (E-UTRA); Radio Resource Control (RRC); Protocol specification (Release 15)", 3GPP TS 36.331 V15.4.0, Dec. 2018, 933 pages.

3rd Generation Partnership Project; Technical Specification Group Radio Access Network, "Evolved Universal Terrestrial Radio Access (E-UTRA); Medium Access Control (MAC) protocol specification (Release 15)", 3GPP TS 36.321 V15.4.0, Dec. 2018, 131 page.

3rd Generation Partnership Project; Technical Specification Group Radio Access Network, "Evolved Universal Terrestrial Radio Access (E-UTRA);Physical layer; Measurements (Release 15)", 3GPP TS 36.214 V15.1.0, Mar. 2018, 24 pages.

3rd Generation Partnership Project; Technical Specification Group Core Network and Terminals, "User Equipment (UE) to V2X control function; protocol aspects; Stage 3 (Release 15)", 3GPP TS 24.386 V15.2.0, Dec. 2018, 35 pages.

CATT, "Multi-Carrier Operation for Sidelink V2X", R2-168109, 3GPP TSG-RAN WG2 Meeting #96, Reno, USA, Nov. 14-18, 2016, 4 pages.

Intel Corporation, "On Carrier Aggregation for LTE V2V Sidelink Communication", R1-1705446, 3GPP TSG RANI WG Meeting #88bis, Spokane, USA, Apr. 3-7, 2017, 9 pages.

LG Electronics, "Discussion on carrier aggregation in PC5 operation", R1-1704839, 3GPP TSG RAN WG1 Meeting #88bis, Spokane, USA Apr. 3-7, 2017, 4 pages.

Nokia, Alcatel-Lucent Shanghai Bell, "On CBR Measurement", R1-1612884, 3GPP TSG-RAN WG1 Meeting #87, Reno, USA Nov. 14-18, 2016, 2 pages.

Intel Corporation, "Details of congestion control for V2V communication," R1-1702142, 3GPP TSG RAN WG1 Meeting #88, Athens, Greece, dated Feb. 13-17, 2017, 9 pages.

JP Office Action in Japanese Appln. No. 2020-503816, dated Jun. 29, 2021, 13 pages (with English translation).

Office Action in Japanese Appln. No. 2020-503816, dated Feb. 15, 2022, 14 pages (with English translation).

* cited by examiner

METHOD FOR SELECTING CARRIERS AND DEVICE SUPPORTING THE SAME

CROSS-REFERENCE TO RELATED APPLICATIONS

This application is a National Stage application under 35 U.S.C. § 371 of International Application No. PCT/KR2018/008414, filed on Jul. 25, 2018, which claims the benefit of U.S. Provisional Application No. 62/536,977 filed on Jul. 25, 2017. The disclosures of the prior applications are incorporated by reference in their entirety.

BACKGROUND OF THE INVENTION

Field of the Invention

The present invention relates to a wireless communication system, and more particularly, to a method selecting carriers and a device supporting the same.

Related Art

Efforts have been made to develop an improved $5^{th}$-generation (5G) communication system or a pre-5G communication system in order to satisfy a growing demand on radio data traffic after commercialization of a $4^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Meanwhile, Sidelink (SL) is UE to UE interface for ProSe direct communication and ProSe direct discovery. Sidelink comprises ProSe direct discovery and ProSe direct communication between UEs. Sidelink uses UL resources and physical channel structure similar to UL transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

SUMMARY OF THE INVENTION

According to a prior art, UE may perform parallel sidelink transmissions on congested carriers, so that increase congestion on those carriers.

According to one embodiment of the present invention, a method for selecting, by a user equipment (UE), carriers in a wireless communication system is provided. The method may comprise: receiving information on carriers and Channel Busy Ratio threshold from a network; selecting at least one carrier of which CBR value is below the CBR threshold; selecting a resource on the selected carrier; and transmitting a medium access control (MAC) packet data unit (PDU) by using the selected resource of the selected carrier.

The MAC PDU may be related to sidelink transmission.

The method may further comprise measuring CBR values of the carriers which are indicated by the network.

The method may further comprise receiving CBR values of the carriers which are indicated by the network, from the network.

The CBR threshold may be provided per UE, per cell, per carrier or per frequency band.

The at least one carrier may be aggregated carrier separated for reception and transmission.

The method may further comprise determining how many carriers to be selected based on an amount of data available for transmission.

The method may further comprise, if a number of carriers determined to be selected is larger than a number of carriers of which CBR value is below the CBR threshold, selecting at least one additional carrier among carriers of which CBR value is above the CBR threshold.

The selecting at least one additional carrier may include selecting the at least one additional carrier in order of CBR value of the additional carrier.

According to one embodiment of the present invention, a user equipment (UE) in a wireless communication system is provided. The UE may comprise: a tranceiver for transmitting or receiving a radio signal; and a processor coupled to the transceiver, the processor configured to: receive information on carriers and Channel Busy Ratio threshold from a network; select at least one carrier of which CBR value is below the CBR threshold; select a resource on the selected carrier; and transmit a medium access control (MAC) packet data unit (PDU) by using the selected resource of the selected carrier.

The MAC PDU may be related to sidelink transmission.

The UE may be further configured to measure CBR values of the carriers which are indicated by the network.

The UE may be further configured to receive CBR values of the carriers which are indicated by the network, from the network.

The CBR threshold may be provided per UE, per cell, per carrier or per frequency band.

The at least one carrier may be aggregated carrier separated for reception and transmission.

ADVANTAGEOUS EFFECTS

According to embodiments of present invention, a UE may perform sidelink transmission using aggregated carrier.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
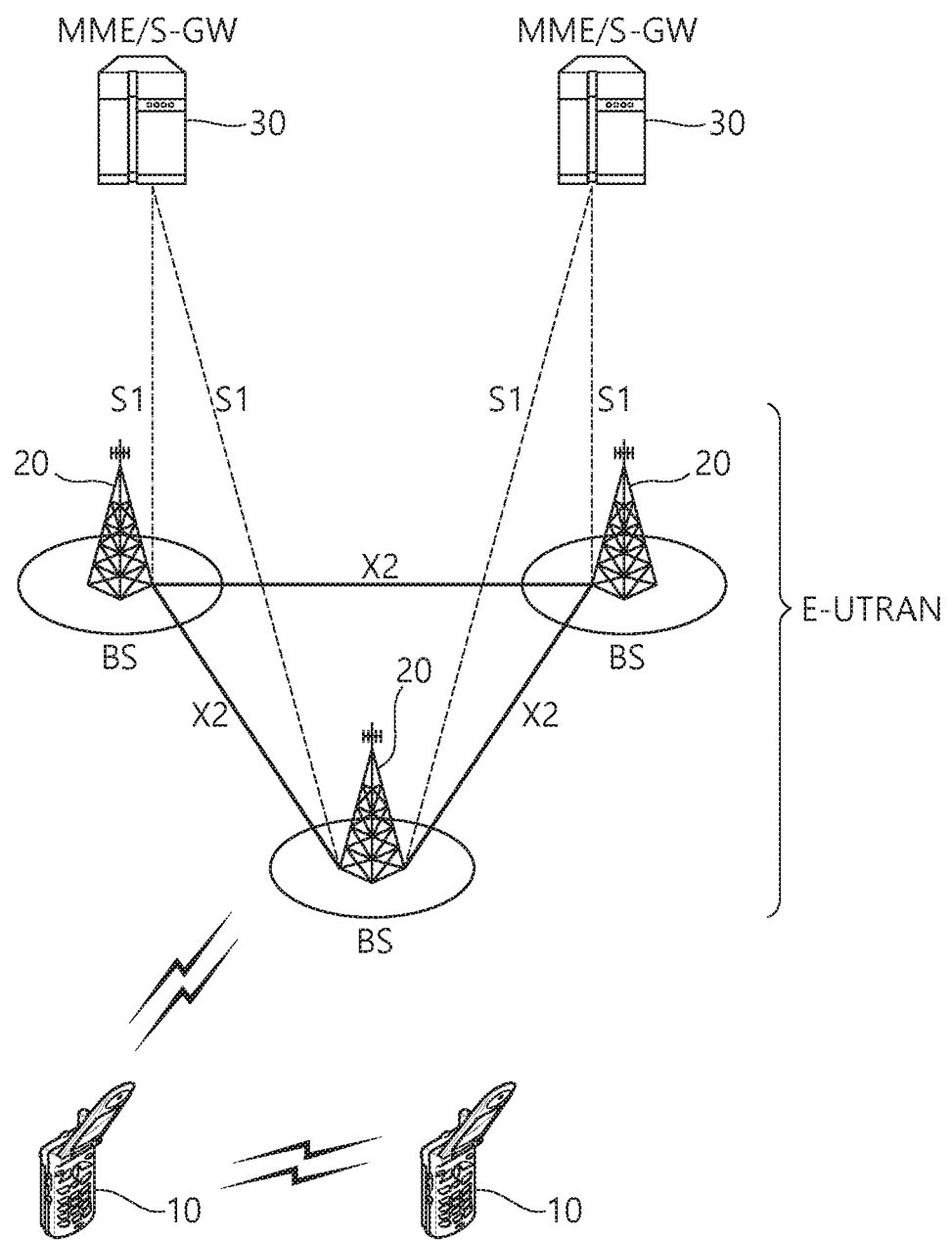
FIG. 1 shows LTE system architecture.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMES/S-GWs and BSs.

Figure 2:
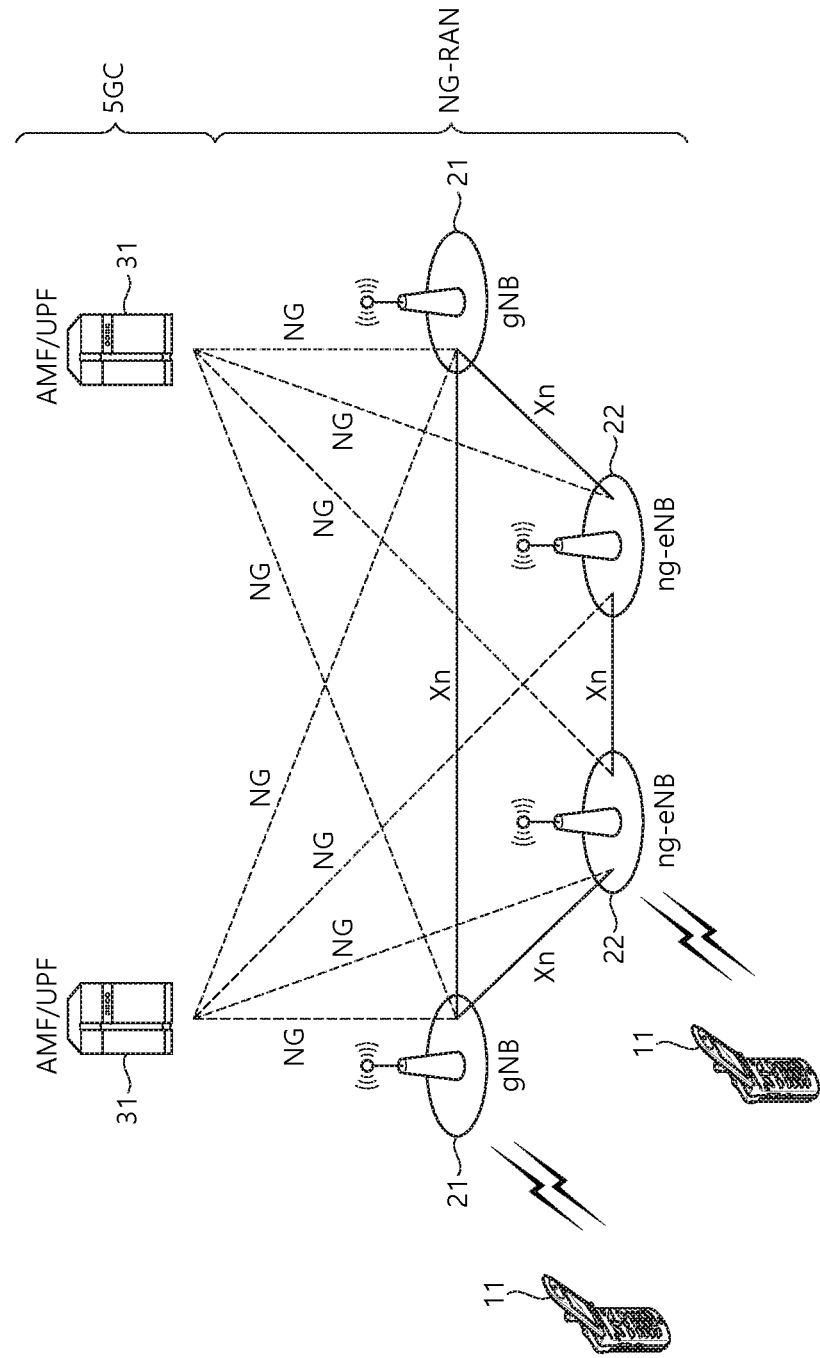
FIG. 2 shows a block diagram of a control plane protocol stack of an LTE system.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
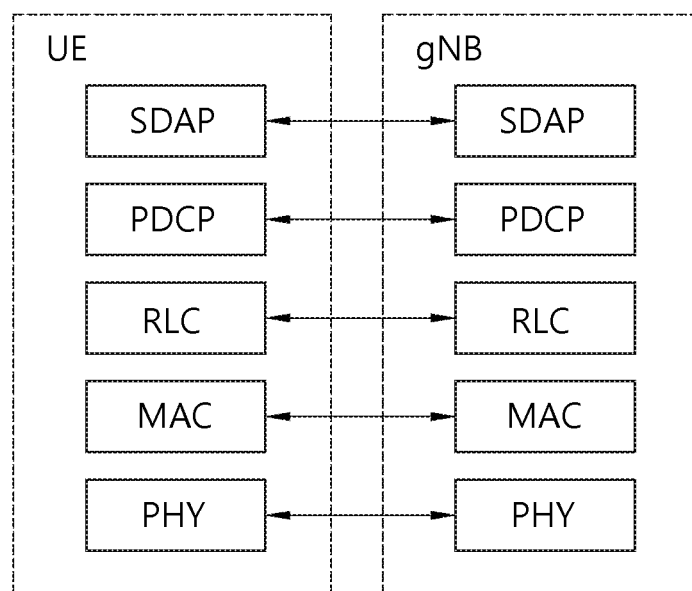
FIG. 3 shows a block diagram of a user plane protocol stack of an LTE system.
Figure 4:
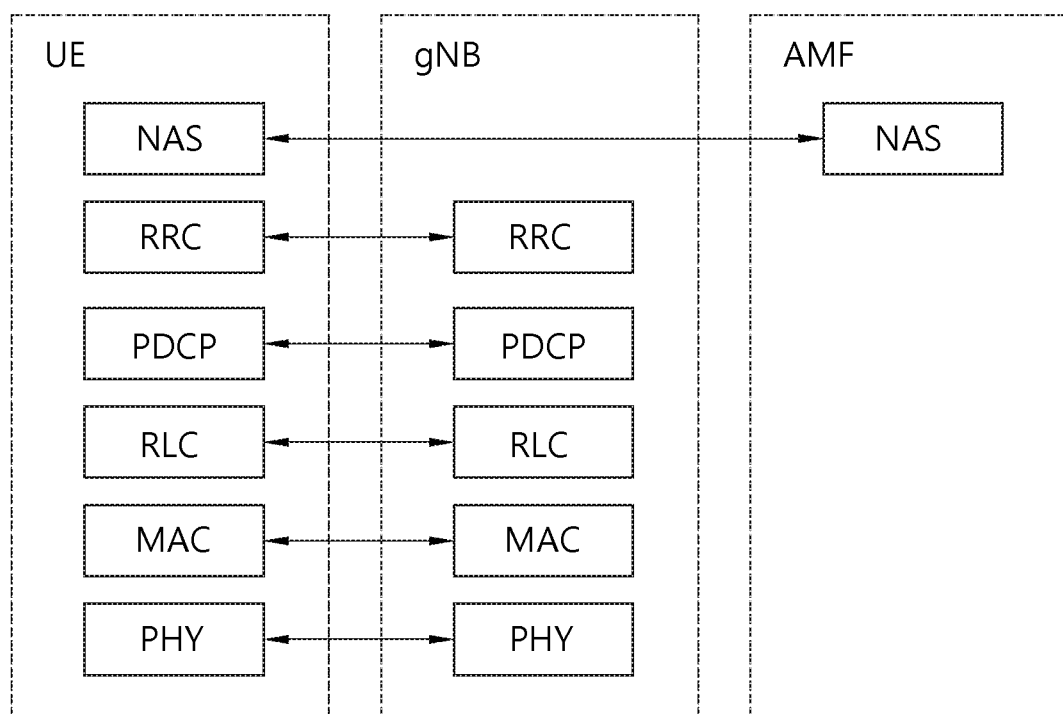
FIG. 4 shows a structure of a 5G system.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARD), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Sidelink is described. Sidelink is a UE to UE interface for sidelink communication, vehicle-to-everything (V2X) sidelink communication and sidelink discovery. The Sidelink corresponds to the PC5 interface. Sidelink transmissions are defined for sidelink discovery, sidelink communication and V2X sidelink communication between UEs. The sidelink transmissions use the same frame structure as the frame structure that is defined for UL and DL when UEs are in network coverage. However, the sidelink transmission are restricted to a sub-set of the UL resources in time and frequency domain. Various physical channels, transport channels and logical channels may be defined for sidelink transmission.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication. The terminology "sidelink communication" without "V2X" prefix may only concern public safety unless specifically stated otherwise.

UE performs sidelink communication on subframes defined over the duration of sidelink control (SC) period. The SC period is the period over which resources allocated in a cell for sidelink control information (SCI) and sidelink data transmissions occur. Within the SC period, the UE sends SCI followed by sidelink data. SCI indicates a Layer 1 ID and characteristics of the transmissions (e.g. modulation and coding scheme (MCS), location of the resource(s) over the duration of SC period, timing alignment).

The UE supporting sidelink communication can operate in two modes for resource allocation. The first mode is a scheduled resource allocation, which may be referred to as "Mode 1" for resource allocation of sidelink communication. In the Mode 1, the UE needs to be RRC_CONNECTED in order to transmit data. The UE requests transmission resources from the BS. The BS schedules transmission resources for transmission of sidelink control information and sidelink data. The UE sends a scheduling request (dedicated scheduling request (D-SR) or random access) to the BS followed by a sidelink buffer status report (BSR). Based on the sidelink BSR, the BS can determine that the UE has data for a sidelink communication transmission and estimate the resources needed for transmission. The BS can schedule transmission resources for sidelink communication using configured sidelink radio network temporary identity (SL-RNTI).

The second mode is a UE autonomous resource selection, which may be referred to as "Mode 2" for resource allocation of sidelink communication. In the Mode 2, a UE on its own selects resources from resource pools and performs transport format selection to transmit sidelink control information and data. There can be up to 8 transmission pools either pre-configured for out of coverage operation or provided by RRC signaling for in-coverage operation. Each pool can have one or more ProSe per-packet priority (PPPP) associated with it. For transmission of a MAC PDU, the UE selects a transmission pool in which one of the associated PPPP is equal to the PPPP of a logical channel with highest PPPP among the logical channel identified in the MAC PDU. It is up to UE implementation how the UE selects amongst multiple pools with same associated PPPP. There is a one to one association between sidelink control pool and sidelink data pool. Once the resource pool is selected, the selection is valid for the entire SC period. After the SC period is finished, the UE may perform resource pool selection again. The UE is allowed to perform multiple transmissions to different destinations in a single SC period.

A UE in RRC_CONNECTED may send a sidelink UE information message to BS when UE becomes interested in sidelink communication. In response, BS may configure the UE with a SL-RNTI.

A UE is considered in-coverage for sidelink communication whenever it detects a cell on a public safety ProSe carrier. If the UE is out of coverage for sidelink communication, it can only use the Mode 2. If the UE is in coverage for sidelink communication, it may use the Mode 1 or the Mode 2 as per BS configuration. If the UE is in coverage for sidelink communication, it shall use only the resource allocation mode indicated by BS configuration, unless one of the exceptional cases occurs. When an exceptional case occurs, the UE is allowed to use the Mode 2 temporarily, even though it was configured to use the Mode 1. Resource pool to be used during exceptional case may be provided by BS.

A set of transmission and reception resource pools for SCI information when the UE is out of coverage for sidelink communication is pre-configured in the UE. The resource pools for SCI when the UE is in coverage for sidelink communication are configured as follows. The resource pools used for reception are configured by the BS via RRC, in broadcast signaling. The resource pool used for transmission is configured by the BS via RRC, in dedicated or broadcast signaling, if the Mode 2 is used. The resource pool used for transmission is configured by the BS via RRC, in dedicated signaling if the Mode 1 is used. In this case, the BS schedules the specific resource(s) for SCI transmission within the configured reception pools.

A set of transmission and reception resource pools for data when the UE is out of coverage for sidelink communication is pre-configured in the UE. The resource pools for data when the UE is in coverage for sidelink communication are configured as follows. The resource pools used for transmission and reception are configured by the BS via RRC, in dedicated or broadcast signaling, if the Mode 2 is used. There is no resource pool for transmission and reception if the Mode 1 is used.

V2X services and V2X sidelink communication is described. V2X services can consist of the following four different types, i.e. vehicle-to-vehicle (V2V), vehicle-to-infrastructure (V2I), vehicle-to-nomadic (V2N) and vehicle-to-pedestrian (V2P). V2X services can be provided by PC5 interface and/or Uu interface. Support of V2X services via PC5 interface is provided by V2X sidelink communication, which is a mode of communication whereby UEs can communicate with each other directly over the PC5 interface. This communication mode is supported when the UE is served by E-UTRAN and when the UE is outside of E-UTRA coverage. Only the UEs authorized to be used for V2X services can perform V2X sidelink communication.

The UE supporting V2X sidelink communication can operate in two modes for resource allocation. The first mode is a scheduled resource allocation, which may be referred to as "Mode 3" for resource allocation of V2X sidelink communication. In the Mode 3, the UE needs to be RRC_CONNECTED in order to transmit data. The UE requests transmission resources from the BS. The BS schedules transmission resources for transmission of sidelink control information and data. Sidelink semi-persistent scheduling (SPS) is supported for the Mode 3.

The second mode is a UE autonomous resource selection, which may be referred to as "Mode 4" for resource allocation of V2X sidelink communication. In the Mode 4, the UE on its own selects resources from resource pools and performs transport format selection to transmit sidelink control information and data. If mapping between the zones and V2X sidelink transmission resource pools is configured, the UE selects V2X sidelink resource pool based on the zone UE is located in. The UE performs sensing for (re)selection of sidelink resources. Based on sensing results, the UE (re) selects some specific sidelink resources and reserves multiple sidelink resources. Up to 2 parallel independent resource reservation processes are allowed to be performed by the UE. The UE is also allowed to perform a single resource selection for its V2X sidelink transmission.

For V2X sidelink transmission, during handover, transmission resource pool configurations including exceptional transmission resource pool for the target cell can be signaled in the handover command to reduce the transmission interruption. In this way, the UE may use the transmission sidelink resource pools of the target cell before the handover is completed, as long as either synchronization is performed with the target cell in case BS is configured as synchronization source or synchronization is performed with global navigation satellite system (GNSS) in case GNSS is configured as synchronization source. If the exceptional transmission resource pool is included in the handover command, the UE starts using randomly selected resources from the exceptional transmission resource pool starting from the reception of handover command. If the UE is configured with the Mode 3 in the handover command, the UE continues to use the exceptional transmission resource pool while the timer associated with handover is running. If the UE is configured with the Mode 4 in the target cell, the UE continues to use the exceptional transmission resource pool until the sensing results on the transmission resource pools for the Mode 4 are available. For exceptional cases (e.g. during radio link failure (RLF), during transition from RRC_IDLE to RRC_CONNECTED or during change of dedicated sidelink resource pools within a cell), the UE may select resources in the exceptional pool provided in serving cell's SIB21 based on random selection, and uses them temporarily. During cell reselection, the RRC_IDLE UE may use the randomly selected resources from the exceptional transmission resource pool of the reselected cell until the sensing results on the transmission resource pools for the Mode 4 are available.

In order to avoid interruption time in receiving V2X messages due to delay in acquiring reception pools broadcasted from the target cell, synchronization configuration and reception resource pool configuration for the target cell can be signaled to RRC_CONNECTED UEs in the handover command. For RRC_IDLE UE, it is up to UE implementation to minimize sidelink transmission/reception interruption time associated with acquisition of SIB21 of the target cell.

A UE is considered in-coverage on the carrier used for V2X sidelink communication whenever it detects a cell on that carrier. If the UE that is authorized for V2X sidelink communication is in-coverage for V2X sidelink communication, it may use the Mode 3 or the Mode 4 as per BS configuration. A set of transmission and reception resource pools when the UE is out of coverage for V2X sidelink communication may be pre-configured in the UE. V2X sidelink communication resources are not shared with other non-V2X data transmitted over sidelink.

An RRC_CONNECTED UE may send a sidelink UE information message to the serving cell if it is interested in V2X sidelink communication transmission in order to request sidelink resources.

If the UE is configured by higher layers to receive V2X sidelink communication and V2X sidelink reception resource pools are provided, the UE receives on those provided resources.

Reception of sidelink V2X communication in different carriers/PLMNs can be supported by having multiple receiver chains in the UE.

For sidelink SPS, maximum 8 SPS configurations with different parameters can be configured by BS and all SPS configurations can be active at the same time. The activation/deactivation of SPS configuration is signalled via PDCCH by BS. The existing logical channel prioritization based on PPPP is used for sidelink SPS.

UE assistance information can be provided to BS. Reporting of UE assistance information is configured by BS for V2X sidelink communication. The UE assistance information used for V2X sidelink communication includes traffic characteristic parameters (e.g. a set of preferred expected SPS interval, timing offset with respect to subframe 0 of the system frame number (SFN) 0, PPPP and maximum transport block (TB) size based on observed traffic pattern) related to the SPS configuration. The UE assistance information can be reported in case either SPS is already configured or not. Triggering of UE assistance information transmission is left to UE implementation. For instance, the UE is allowed to report UE assistance information when change in estimated periodicity and/or timing offset of packet arrival occurs. SR mask per traffic type is not supported for V2X sidelink communication.

For controlling channel utilization, the network is able to indicate how the UE adapts its transmission parameters for each transmission pool depending on the channel busy ratio (CBR). The UE measures all the configured transmission pools including exceptional pool. Only data pool is measured for the case scheduling assignment (SA) pool and data pool resources are located adjacently, while SA pool and data pool is measured separately for the case SA pool and data pool are located non-adjacently.

A UE in RRC_CONNECTED can be configured to report CBR measurement results. For CBR reporting, periodic reporting and event triggered reporting are supported. Two new reporting events defined only for the data pool are introduced for event-triggered CBR reporting. CBR event-triggered reporting is triggered by overloaded threshold and/or less-loaded threshold. The network can configure which of the transmission pools the UE needs to report.

A UE (regardless of its RRC state) performs transmission parameter adaptation based on the CBR. The exemplary adapted transmission parameters include maximum transmission power, range of the number of retransmission per TB, range of physical sidelink shared channel (PSSCH) resource block number, range of MCS, maximum limit on channel occupancy ratio. The transmission parameter adaption applies to all transmission pools including exceptional pool.

Sidelink transmission and/or reception resources including exceptional pool for different frequencies for the Mode 3 and Mode 4 may be provided. The sidelink resources for different frequencies can be provided via dedicated signaling, SIB21 and/or pre-configuration. The serving cell may indicate to the UE only the frequency on which the UE may acquire the sidelink resource configuration. If multiple frequencies and associated resource information are provided, it is up to UE implementation to select the frequency among the provided frequencies. The UE shall not use pre-configured transmission resource if the UE detects a cell providing resource configuration or inter-carrier resource configuration for V2X sidelink communication. Frequencies which may provide V2X sidelink communication resource configuration or cross-carrier configuration can be pre-configured. The RRC_IDLE UE may prioritize the frequency that provides resource configuration for V2X sidelink communication for other carrier during cell reselection.

If the UE supports multiple transmission chains, it may simultaneously transmit on multiple carriers via PC5. For the case where multiple frequencies for V2X are supported, a mapping between service types and V2X frequencies is configured by upper layers. The UE should ensure a service to be transmitted on the corresponding frequency.

The UE may receive the V2X sidelink communication of other PLMNs. The serving cell can indicate to the UE the RX resource configuration for inter-PLMN operation directly or only the frequency on which the UE may acquire the inter-PLMN sidelink resource configuration. Sidelink transmission in other PLMNs is not allowed.

When UL transmission overlaps in time domain with V2X sidelink transmission in the same frequency, the UE prioritizes the sidelink transmission over the UL transmission if the PPPP of sidelink MAC PDU is lower than a (pre) configured PPPP threshold. When UL transmission overlaps in time domain with sidelink transmission in different frequency, the UE may prioritize the sidelink transmission over the UL transmission or reduce UL transmission power if the PPPP of sidelink MAC PDU is lower than a (pre)configured PPPP threshold. However, if UL transmission is prioritized by upper layer or RACH procedure is performed, the UE prioritizes UL transmission over any V2X sidelink transmission (i.e. irrespectively of the sidelink MAC PDU's PPPP).

Detailed operation by MAC sublayer regarding V2X sidelink communication transmission is described. In order to transmit on the sidelink shared channel (SL-SCH), the MAC entity must have at least one sidelink grant.

Sidelink grants are selected as follows for sidelink communication:

1> if the MAC entity is configured to receive a single sidelink grant dynamically on the PDCCH and more data is available in sidelink traffic channel (STCH) than can be transmitted in the current SC period, the MAC entity shall:

2> using the received sidelink grant determine the set of subframes in which transmission of SCI and transmission of first transport block occur;

2> consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available;

2> clear the configured sidelink grant at the end of the corresponding SC Period;

1> else, if the MAC entity is configured by upper layers to receive multiple sidelink grants dynamically on the PDCCH and more data is available in STCH than can be transmitted in the current SC period, the MAC entity shall for each received sidelink grant:

2> using the received sidelink grant determine the set of subframes in which transmission of SCI and transmission of first transport block occur;

2> consider the received sidelink grant to be a configured sidelink grant occurring in those subframes starting at the beginning of the first available SC Period which starts at least 4 subframes after the subframe in which the sidelink grant was received, overwriting a previously configured sidelink grant received in the same subframe number but in a different radio frame as this configured sidelink grant occurring in the same SC period, if available;

2> clear the configured sidelink grant at the end of the corresponding SC Period;

1> else, if the MAC entity is configured by upper layers to transmit using one or multiple pool(s) of resources and more data is available in STCH than can be transmitted in the current SC period, the MAC entity shall for each sidelink grant to be selected:

2> if configured by upper layers to use a single pool of resources:
3> select that pool of resources for use;
2> else, if configured by upper layers to use multiple pools of resources:
3> select a pool of resources for use from the pools of resources configured by upper layers whose associated priority list includes the priority of the highest priority of the sidelink logical channel in the MAC PDU to be transmitted;
2> randomly select the time and frequency resources for SL-SCH and SCI of a sidelink grant from the selected resource pool. The random function shall be such that each of the allowed selections can be chosen with equal probability;
2> use the selected sidelink grant to determine the set of subframes in which transmission of SCI and transmission of first transport block occur;
2> consider the selected sidelink grant to be a configured sidelink grant occurring in those subframes starting at the beginning of the first available SC Period which starts at least 4 subframes after the subframe in which the sidelink grant was selected;
2> clear the configured sidelink grant at the end of the corresponding SC Period. Sidelink grants are selected as follows for V2X sidelink communication:
1> if the MAC entity is configured to receive a sidelink grant dynamically on the PDCCH and data is available in STCH, the MAC entity shall:
2> use the received sidelink grant to determine the number of HARQ retransmissions and the set of subframes in which transmission of SCI and SL-SCH occur;
2> consider the received sidelink grant to be a configured sidelink grant;
1> else, if the MAC entity is configured by upper layers to transmit based on sensing using a pool of resources, the MAC entity selects to create a configured sidelink grant corresponding to transmissions of multiple MAC PDUs, and data is available in STCH, the MAC entity shall for each Sidelink process configured for multiple transmissions based on sensing:
2> if SL_RESOURCE_RESELECTION_COUNTER=0 and the MAC entity randomly selects, with equal probability, a value in the interval [0, 1] which is above the probability configured by upper layers in probResourceKeep; or
2> if the configured sidelink grant cannot accommodate a RLC SDU by using the maximum allowed MCS configured by upper layers in maxMCS-PSSCH and the MAC entity selects not to segment the RLC SDU; or
2> if a pool of resources is configured or reconfigured by upper layers:
3> clear the configured sidelink grant, if available;
3> randomly select, with equal probability, an integer value in the interval [5, 15] and set SL_RESOURCE_RESELECTION_COUNTER to the selected value;
3> select the number of HARQ retransmissions from the allowed numbers configured by upper layers in allowedRetxNumberPSSCH, and an amount of frequency resources within the range configured by upper layers between minRB-NumberPSSCH and maxRB-NumberPSSCH;
3> select one of the allowed values configured by upper layers in restrictResourceReservationPeriod and set the resource reservation interval by multiplying 100 with the selected value;
3> randomly select one time and frequency resource from the resources indicated by the physical layer. The random function shall be such that each of the allowed selections can be chosen with equal probability;
3> use the randomly selected resource to select a set of periodic resources spaced by the resource reservation interval for transmission opportunities of SCI and SL-SCH corresponding to the number of transmission opportunities of MAC PDUs;
3> if the number of HARQ retransmissions is equal to 1 and there are available resources left in the resources indicated by the physical layer that meet the conditions for more transmission opportunities:
4> randomly select one time and frequency resource from the available resources. The random function shall be such that each of the allowed selections can be chosen with equal probability;
4> use the randomly selected resource to select a set of periodic resources spaced by the resource reservation interval for the other transmission opportunities of SCI and SL-SCH corresponding to the number of retransmission opportunities of the MAC PDUs;
4> consider the first set of transmission opportunities as the new transmission opportunities and the other set of transmission opportunities as the retransmission opportunities;
4> consider the set of new transmission opportunities and retransmission opportunities as the selected sidelink grant.
3> else:
4> consider the set as the selected sidelink grant;
3> use the selected sidelink grant to determine the set of subframes in which transmissions of SCI and SL-SCH occur;
3> consider the selected sidelink grant to be a configured sidelink grant;
2> else if SL_RESOURCE_RESELECTION_COUNTER=0 and the MAC entity randomly selects, with equal probability, a value in the interval [0, 1] which is less than or equal to the probability configured by upper layers in probResourceKeep:
3> clear the configured sidelink grant, if available;
3> randomly select, with equal probability, an integer value in the interval [5, 15] and set SL_RESOURCE_RESELECTION_COUNTER to the selected value;
3> use the previously selected sidelink grant for the number of transmissions of the MAC PDUs with the resource reservation interval to determine the set of subframes in which transmissions of SCI and SL-SCH occur;
3> consider the selected sidelink grant to be a configured sidelink grant;
1> else, if the MAC entity is configured by upper layers to transmit based on either sensing or random selection using a pool of resources, the MAC entity selects to create a configured sidelink grant corresponding to transmission(s) of a single MAC PDU, and data is available in STCH, the MAC entity shall for a Sidelink process:
2> select the number of HARQ retransmissions from the allowed numbers configured by upper layers in allowedRetxNumberPSSCH, and an amount of frequency resources within the range configured by upper layers between minRB-NumberPSSCH and maxRB-NumberPSSCH;
2> if transmission based on random selection is configured by upper layers:
3> randomly select the time and frequency resources for one transmission opportunity of SCI and SL-SCH from the resource pool. The random function shall be such that each of the allowed selections can be chosen with equal probability;

2> else:
3> randomly select the time and frequency resources for one transmission opportunity of SCI and SL-SCH from the resource pool indicated by the physical layer. The random function shall be such that each of the allowed selections can be chosen with equal probability;
2> if the number of HARQ retransmissions is equal to 1:
3> if transmission based on random selection is configured by upper layers and there are available resources that meet the conditions for one more transmission opportunity:
4> randomly select the time and frequency resources for the other transmission opportunity of SCI and SL-SCH corresponding to additional transmission of the MAC PDU from the available resources. The random function shall be such that each of the allowed selections can be chosen with equal probability;
3> else, if transmission based on sensing is configured by upper layers and there are available resources, except the resources already excluded by the physical layer, that meet the conditions for one more transmission opportunity:
4> randomly select the time and frequency resources for the other transmission opportunity of SCI and SL-SCH corresponding to additional transmission of the MAC PDU from the available resources. The random function shall be such that each of the allowed selections can be chosen with equal probability;
3> consider a transmission opportunity which comes first in time as the new transmission opportunity and a transmission opportunity which comes later in time as the retransmission opportunity;
3> consider both of the transmission opportunities as the selected sidelink grant;
2> else:
3> consider the transmission opportunity as the selected sidelink grant;
2> use the selected sidelink grant to determine the subframes in which transmission(s) of SCI and SL-SCH occur;
2> consider the selected sidelink grant to be a configured sidelink grant; The MAC entity shall for each subframe:
1> if the MAC entity has a configured sidelink grant occurring in this subframe:
2> if the configured sidelink grant corresponds to transmission of SCI:
3> instruct the physical layer to transmit SCI corresponding to the configured sidelink grant;
3> for V2X sidelink communication, deliver the configured sidelink grant and the associated HARQ information to the Sidelink HARQ Entity for this subframe;
2> else if the configured sidelink grant corresponds to transmission of first transport block for sidelink communication:
3> deliver the configured sidelink grant and the associated HARQ information to the Sidelink HARQ Entity for this subframe.

According to the prior art, a resource pool is configured only on a single carrier. A UE RRC (i.e. the RRC layer of the UE) may select a resource pool on a single carrier and then UE MAC (i.e. the MAC layer of the UE) may perform resource (re-)selection on the selected pool. Hence, if UE performs parallel transmissions on different carriers, the UE will independently select resources on each carrier. In this case, the UE may perform parallel sidelink transmissions on congested carriers, so that increase congestion on those carriers.

In release 15, Carrier aggregation (CA) in sidelink is supported for V2X sidelink communication. It applies to both in coverage UEs and out of coverage UEs. For CA in sidelink, neither primary component carrier nor secondary component carriers are defined. Each resource pool (pre) configured for V2X sidelink communication transmission or reception is associated to a single carrier.

When a UE supporting CA in sidelink uses autonomous resource selection, it performs carrier selection and may select one or more carriers used for V2X sidelink communication transmission. The carrier selection is performed at MAC layer, depending on the CBR of the (pre)configured carriers for V2X sidelink communication and the PPPP(s) of the V2X messages to be transmitted. The carrier reselection may be performed when resource reselection is triggered and is triggered for each sidelink process. In order to avoid frequent switching across different carriers, the UE may keep using a carrier already selected for transmission, if the measured CBR on this carrier is lower than a (pre)configured threshold. For a UE using autonomous resource selection, logical channel prioritization is performed for a sidelink resource on a carrier depending on the CBR measured on the carrier and the PPPP of the sidelink logical channels as specified in 3GPP TS 36.321 [13].

Hereinafter, method for selecting carriers according to an embodiment of present invention is described. In an embodiment of the invention, if a UE is configured with multiple carriers or resource pools, the UE may select carriers or multiple resource pools of which CBR value is below a threshold indicated by the network among the configured carriers or resource pools. Then, the UE may select sidelink resources (i.e. sidelink grants) on some or all of the selected carriers or the selected resource pools to transmit one or more MAC PDUs.

Alternatively, the UE may select sidelink resources (i.e. sidelink grants) on all of the configured carriers or resource pools. Then, UE may allocate only sidelink resources of particular carriers or resource pools to sidelink logical channels in the Logical Channel Prioritization procedure. The particular carrier or resource pool may provide a CBR value below the threshold indicated by the network.

The UE may monitor the selected carriers or the selected resource pools to receive one or more MAC PDUs.

In an embodiment of the invention, the network may indicate to UE which resource pools can be aggregated in sidelink can be aggregated in sidelink e.g. via system information and/or a dedicated signaling. The network may indicate information to the UE described as below:

The network may indicate the aggregated carriers per resource pool, per band, or per band combination.

The network may indicate the aggregated resource pools or the aggregated carriers separately for reception and transmission.

The network may indicate a congestion threshold such as CBR (Channel Busy Ratio) threshold. The threshold is per UE, per cell, per carrier, per frequency band or per resource pool.

The network may indicate CBR level of a particular carrier or a particular resource pool.

The UE may (randomly) select one or more carriers of which CBR value is below the threshold among the indicated carriers. The UE may know the CBR level of each carrier either by measuring CBR by a lower layer on the carrier or by receiving a CBR value from a cell.

If the UE cannot find a carrier of which CBR value is below the threshold, or if the UE needs additional carrier to transmit data, the UE may select a carrier with the lowest CBR value in an increasing order of the CBR value among the carriers of which CBR value is equal to or above the threshold.

The UE may select sidelink resources on the selected carrier(s) and then transmit SCI (Sidelink Control Information) and/or data on the selected sidelink resources. The sidelink resource may correspond to a sidelink logical channel.

The UE may monitor or receive SCI (Sidelink Control Information) on the selected carrier(s). Then, the UE may receive data on the carrier(s) indicated by the SCI.

Figure 5:
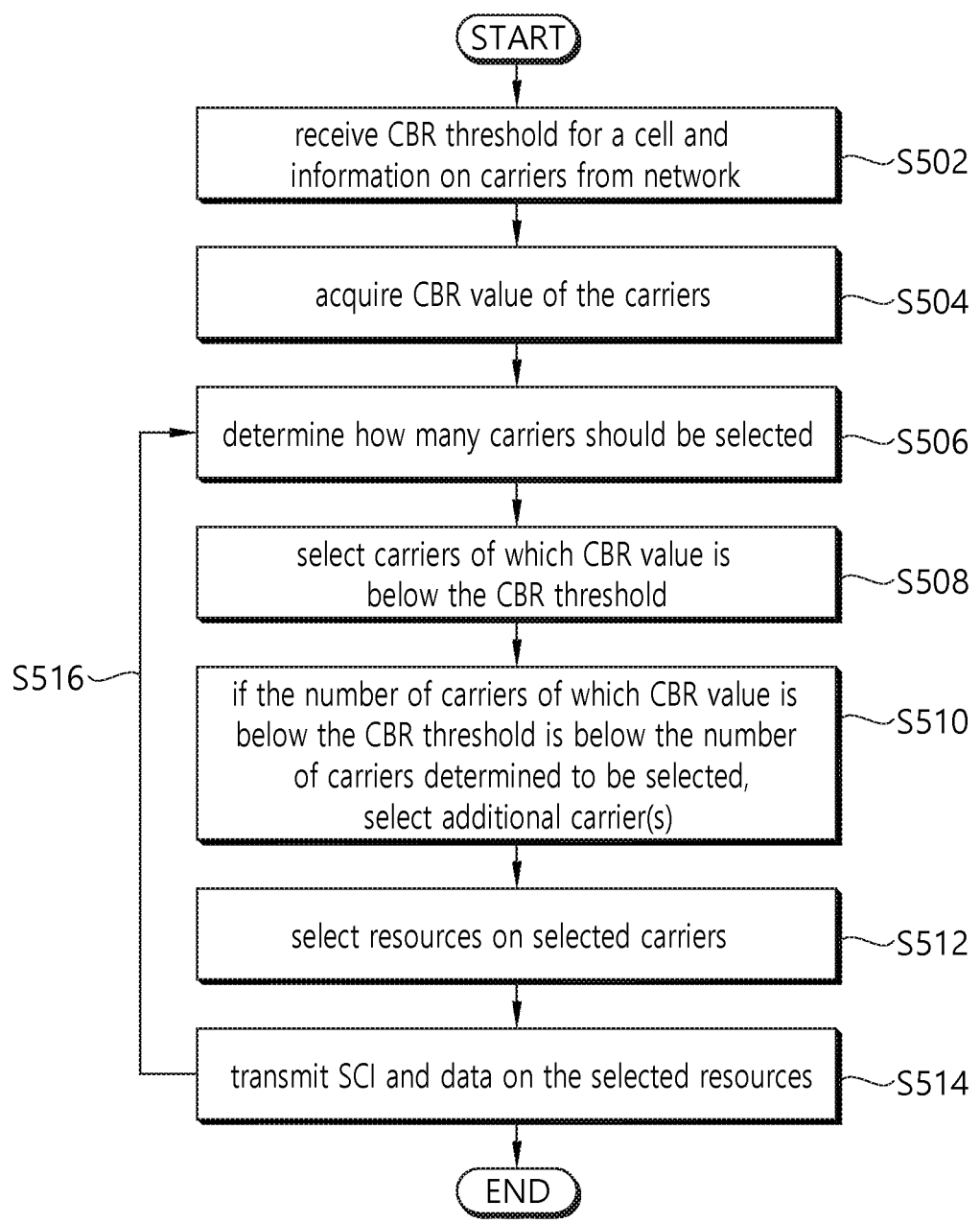
FIG. 5 shows a flow chart of a method for selecting carriers according to an embodiment of the present invention.

FIG. 5 shows a flow chart of a method for selecting carriers according to an embodiment of the present invention. Following steps are details about how the UE selects one or more carriers. In this embodiment, carriers may be replaced by resource pools, because each resource pool is associated to a single carrier.

In step S502, the network may indicate CBR threshold for a cell and information on carriers. For example, the network may indicate 0.3 as the CBR threshold for the cell, and the network may indicate carrier #1, carrier #2, carrier #3 and carrier #4.

In step S504, the UE may acquire CBR value of the carriers indicated by the network.

According to the exemplary embodiments, the UE may acquire CBR value of carrier #1, carrier #2, carrier #3 and carrier #4. To acquire the CBR value of each carrier, the UE camping on the cell or the UE served by the cell may perform measurement on the carriers. Alternatively, the UE may receive a CBR value for each carrier from the network. According to an embodiment of the present invention, the acquired CBR value of each carrier as below.

CBR value of carrier #1=0.4
CBR value of carrier #2=0.1
CBR value of carrier #3=0.2
CBR value of carrier #4.=0.6

In step S506, the UE may determine how many carriers should be selected e.g. based on the amount of data available for transmission in L2 buffer. According to an embodiment of the present invention, the UE may determine that 3 carriers should be selected.

In step S508, the UE may select carriers of which CBR value is below the CBR threshold indicated by the network. According to the exemplary embodiments, the CBR threshold indicated by the network may be 0.3. In this case, UE selects carrier #2 of which CBR value is 0.1, and carrier #3 of which CBR value is 0.2.

In step S510, if the number of carriers of which CBR value is below the SBR threshold is smaller than the number of carriers which is determined to be selected, the UE may select additional carriers. In this case, the additional carriers may be carriers of which CBR value that is equal to or above the CBR threshold. The number of the additional carriers may be a difference between the number of carriers of which CBR value is below the CBR threshold and the number of carriers which is determined to be selected. According to the exemplary embodiments, even though the UE needs to select 3 carriers in total, but the UE selected only 2 carriers in step S508. Thus, the UE may select an additional carrier of which CBR value is equal to or above 0.3. The additional carriers may be selected in order of increasing CBR value. That is, a priority among the carriers is configured based on each CBR value. Since carrier #1 provides the lowest CBR value among the carriers of which CBR value is above 0.3, UE may select carrier #1.

On the other hand, if the number of carriers of which CBR value is below the CBR threshold is larger than the number of carriers which is determined to be selected, the UE may select any carrier of which CBR value is below the CBR threshold. According to an embodiment of present invention, in this case, the UE may select randomly carrier(s) among carriers of which CBR value is below the CBR threshold, or select carrier(s) in the order of CBR value of a carrier among carriers of which CBR value is below the CBR threshold.

In step S512, the UE may select resources on each selected carrier. According to an embodiment of the present invention, the resources mentioned in this step may be sidelink resources. According to the exemplary embodiments, the UE may select resources on each of carrier #1, carrier #2 and carrier #3. Namely, the UE may not select resources on non-selected carrier which is configured by RRC.

The UE may occupy data on each carrier in the order of CBR value of a carrier. In specific, the UE may occupy data on each carrier in order from lowest CBR value to higher CBR value. According to the exemplary embodiments, the UE may occupy carrier #2 at first. Then, if UE has remaining data to be transmitted, especially in sidelink, the UE may occupy carrier #3. Finally, if UE still has remaining data to be transmitted, the UE may occupy carrier #1.

In step S514, the UE may transmit SCI and data on the selected resources of carrier #1, carrier #2 and carrier #3.

In step S516, whenever data becomes available for transmission in L2 buffer, the UE may determine how many carrier should be selected e.g. based on the amount of data available for transmission in L2 buffer. For example, the UE may determine that 1 carrier should be selected. In this case, the UE may select one carrier of which CBR value is below 0.3. Thus, the UE may randomly select one of carrier #2 and carrier #3. Further, the UE may select sidelink resources on the selected carrier. Then, UE may transmit SCI and data on the selected resources of the selected carrier. In this way, the steps described above may be repeated.

According to an embodiment of the present invention, selecting carrier may indicate that the UE may also select a resource pool which is associated to the carrier.

Figure 6:
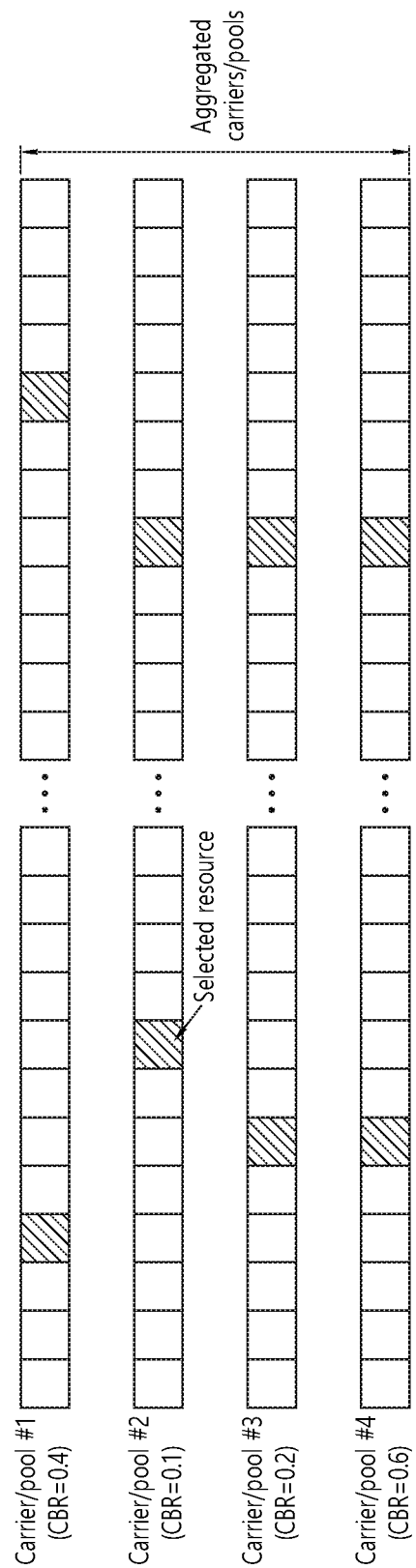
FIG. 6 shows an example of a method for selecting carriers according to an embodiment of the present invention.

FIG. 6 shows an example of a method for selecting carriers according to an embodiment of the present invention.

The network may indicate a CBR threshold for a cell and information on carriers. For example, the network may indicate 0.3 as the CBR threshold for the cell, and the network may indicate carrier #1, carrier #2, carrier #3 and carrier #4. In FIG.6, the carrier #1 may correspond to resource pool #1, the carrier #2 may correspond to resource pool #2, the carrier #3 may correspond to resource pool #3, and the carrier #4 may correspond to resource pool #4.

Referring FIG. 6, the indicated carriers provide CBR values as follow.

CBR value of carrier #1=0.4
CBR value of carrier #2=0.1
CBR value of carrier #3=0.2
CBR value of carrier #4=0.6

According to an embodiment of the present invention, the UE may select carriers of which CBR value is below the CBR threshold. If the UE determined that 2 carriers should be selected e.g. based on the amount of data available for transmission in L2 buffer, then the UE may select carrier #2 and carrier #3. On the other hand, if the UE determined that only 1 carrier should be selected, the UE may select carrier in the order of CBR value of carrier. In specific, the UE may occupy data on each carrier in order from lowest CBR value to higher CBR value. In the embodiment of the present invention, the UE may select carrier #2 which provides smaller CBR value.

Figure 7:
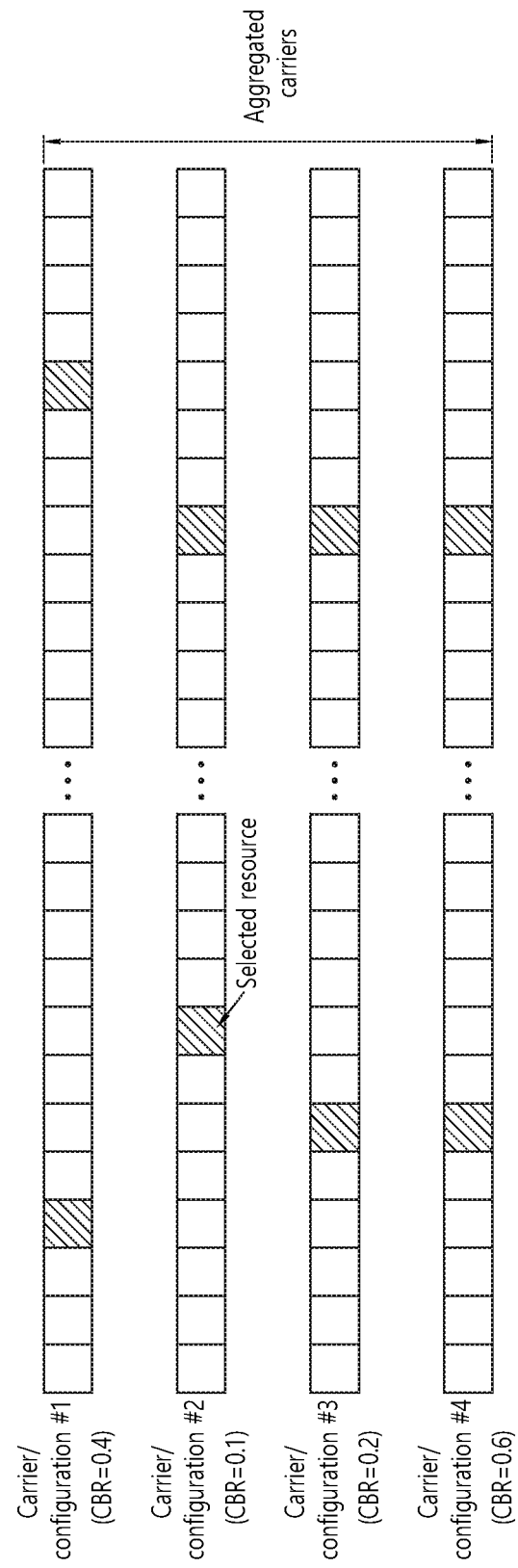
FIG. 7 shows an example of a method for selecting carriers according to an embodiment of the present invention.

FIG. 7 shows an example of a method for selecting carriers according to an embodiment of the present invention.

In this embodiment of present invention, a resource pool mentioned above can be replaced by a SPS configuration or a set of allocated resources of an activated SPS configuration. That is, the carrier #1 may correspond to a SPS configuration #1, the carrier #2 may correspond to a SPS configuration #2, the carrier #3 may correspond to a SPS configuration #3, and the carrier #4 may correspond to a SPS configuration #4. Thus, the embodiment can be applied to carrier selection for multiple SPS configurations as shown in FIG. 7. For example, UE may (randomly) select one or more carriers or one or more activated SPS configurations of which CBR value is below the threshold among the indicated carriers of the activated SPS configurations, if CBR values are known to UE.

Figure 8:
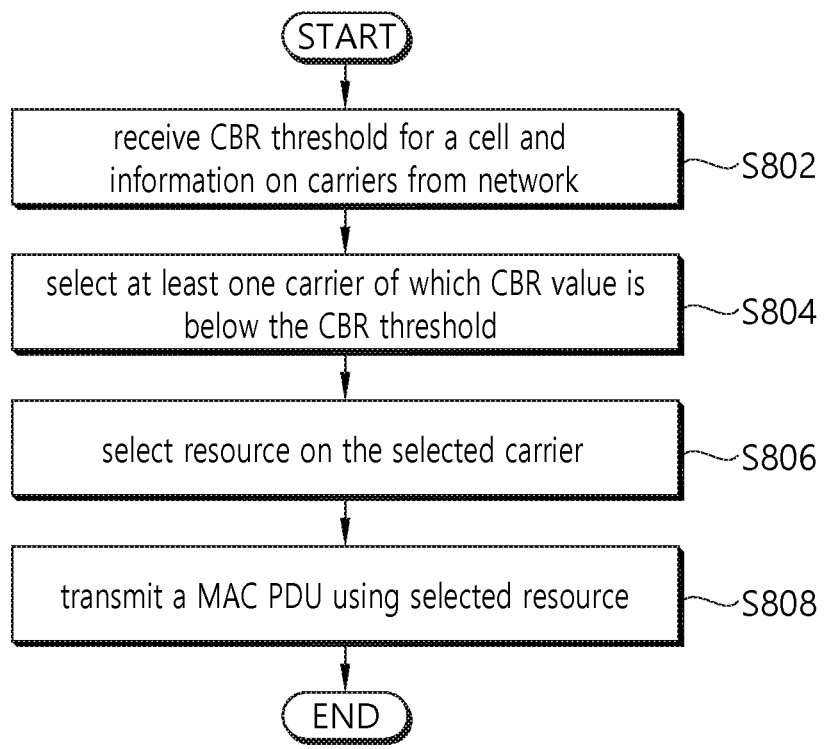
FIG. 8 shows a flow chart of a method for selecting carriers according to an embodiment of the present invention.

FIG. 8 shows a flow chart of a method for selecting carriers according to an embodiment of the present invention.

In step S802, the UE may receive information on carriers and Channel Busy Ratio threshold from a network. The CBR threshold may be provided per UE, per cell, per carrier or per frequency band.

In step S804, the UE may select at least one carrier of which CBR value is below the CBR threshold. For that, the UE may measure CBR values of the carriers which are indicated by the network, or receive CBR values of the carriers which are indicated by the network, from the network. The at least one carrier may be aggregated carrier separated for reception and transmission.

In step S806, the UE may select a resource on the selected carrier.

In step S810, the UE may transmit a medium access control (MAC) packet data unit (PDU) by using the selected resource of the selected carrier. The MAC PDU may be related to sidelink transmission.

Further, the UE may determine how many carriers to be selected based on an amount of data available for transmission. If a number of carriers determined to be selected is larger than a number of carriers of which CBR value is below the CBR threshold, the UE may select at least one additional carrier among carriers of which CBR value is above the CBR threshold. The UE may select the at least one additional carrier in order of CBR value of the additional carrier.

According to an embodiment of present invention, a MAC entity of a UE may operate as follow. The MAC entity shall consider a CBR of a carrier to be one measured by lower layers according to 3GPP TS 36.214 [6] if CBR measurement results are available, or the corresponding defaultTxConfigIndex configured by upper layers for the carrier if CBR measurement results are not available.

The MAC entity shall:

if the MAC entity is configured by upper layers to transmit using pool(s) of resources on one or multiple carriers as indicated in subclause 5.10.13.1 of 3GPP TS 36.331 [8] and data is available in STCH (i.e. initial Tx carrier selection):

for each sidelink logical channel where data is available:

for each carrier configured by upper layers (3GPP TS 24.386 [15]) associated with the concerned sidelink logical channel:

if the CBR of the carrier is below threshCBR-FreqReselection associated with the priority of the sidelink logical channel:

consider the carrier as a candidate carrier for TX carrier (re-)selection for the concerned sidelink logical channel.

else if the MAC entity has been configured by upper layers to transmit using pool(s) of resources on one or multiple carriers as indicated in subclause 5.10.13.1 of 3GPP TS 36.331 [8], and the TX carrier reselection is triggered for a process associated with a carrier according to sub-clause 5.14.1.1 (i.e. Tx carrier reselection):

for each sidelink logical channel allowed on the carrier where data is available and Tx carrier (re-)selection is triggered:

for each carrier configured by upper layers, if the CBR of the carrier is below threshCBR-FreqReselection associated with the priority of the sidelink logical channel;

consider the carrier as a candidate carrier for TX carrier (re-)selection.

Figure 9:
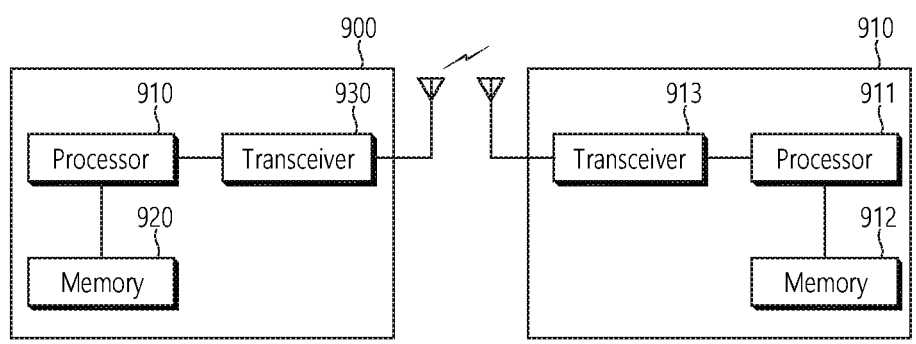
FIG. 9 shows a communication system to implement an embodiment of the present invention.

The MAC entity shall:

if one or more carriers are considered as the candidate carriers for TX carrier (re-) selection:

for each sidelink logical channel allowed on the carrier where data is available and Tx carrier (re-)selection is triggered, select one or more carrier(s) and associated pool(s) of resources among the candidate carriers with increasing order of CBR from the lowest CBR;

FIG. 9 shows a communication system to implement an embodiment of the present invention.

A UE 900 includes a processor 901, a memory 902, and a transceiver 903. The memory 902 is coupled to the processor 901, and stores a variety of information for driving the processor 901. The transceiver 903 is coupled to the processor 901, and transmits and/or receives a radio signal. The processor 901 implements the proposed functions, procedures, and/or methods. In the aforementioned embodiments, an operation of the first network node may be implemented by the processor 901.

A network node 910 includes a processor 911, a memory 912, and a transceiver 913. The memory 912 is coupled to the processor 911, and stores a variety of information for driving the processor 911. The transceiver 913 is coupled to the processor 911, and transmits and/or receives a radio signal. The processor 911 implements the proposed functions, procedures, and/or methods. In the aforementioned embodiments, an operation of the second network node 910 may be implemented by the processor 911.

The processors 911 may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a wireless device operating in a wireless communication system, the method comprising:
    acquiring information regarding multiple carriers and multiple channel busy ratio (CBR) thresholds, wherein each of the multiple CBR thresholds is configured per each of the multiple carriers;
    acquiring a CBR value of each of the multiple carriers;
    determining a number of carriers to be selected;
    selecting at least one candidate carrier among the multiple carriers, where for each of the at least one candidate carrier, the candidate carrier has a CBR value below a CBR threshold which is configured for the candidate carrier;
    based on the number of carriers to be selected being larger than the number of the at least one candidate carrier, selecting at least one additional carrier among the multiple carriers in an increasing order of the CBR value from a lowest CBR value of the at least one additional carrier, where for each of the at least one additional carrier, the additional carrier has a CBR value above a CBR threshold which is configured for the additional carrier;
    selecting a sidelink resource on the selected at least one candidate carrier and the at least one additional carrier; and
    transmitting a medium access control (MAC) packet data unit (PDU) based on the sidelink resource.

2. The method of claim 1, wherein the MAC PDU is related to sidelink transmission.

3. The method of claim 1, wherein the CBR value is measured by the wireless device and/or is received from a network.

4. The method of claim 1, wherein the number of carriers to be selected is determined based on an amount of data available for transmission.

5. A wireless device configured to operate in a wireless communication system, the wireless device comprising:
    a transceiver;
    a processor; and
    a memory operably connectable to the processor and storing instructions that, based on being executed by the processor, perform operations comprising:
    acquiring information regarding multiple carriers and multiple channel busy ratio (CBR) thresholds, wherein each of the multiple CBR thresholds is configured per each of the multiple carriers;
    acquiring a CBR value of each of the multiple carriers;
    determining a number of carriers to be selected;
    selecting at least one candidate carrier among the multiple carriers, where for each of the at least one candidate carrier, the candidate carrier has a CBR value below a CBR threshold which is configured for the candidate carrier;
    based on the number of carriers to be selected being larger than the number of the at least one candidate carrier, selecting at least one additional carrier among the multiple carriers in an increasing order of the CBR value from a lowest CBR value of the at least one additional carrier, where for each of the at least one additional carrier, the additional carrier has a CBR value above a CBR threshold which is configured for the additional carrier;
    selecting a sidelink resource on the selected at least one candidate carrier and the at least one additional carrier; and
    transmitting, via the transceiver, a medium access control (MAC) packet data unit (PDU) based on the sidelink resource.

6. The wireless device of claim 5, wherein the MAC PDU is related to sidelink transmission.

7. The wireless device of claim 5, wherein the CBR value is measured by the wireless device and/or is received from a network.

8. The method of claim 1, wherein the wireless device communicates with at least one of a mobile terminal, a network or autonomous vehicles other than the wireless device.

9. A processing apparatus configured to operate in a wireless communication system, the processing apparatus comprising:
    a processor; and
    a memory operably connectable to the processor and storing instructions that, based on being executed by the processor, perform operations comprising:
    acquiring information regarding multiple carriers and multiple channel busy ratio (CBR) thresholds, wherein each of the multiple CBR thresholds is configured per each of the multiple carriers;
    acquiring a CBR value of each of the multiple carriers;
    determining a number of carriers to be selected;
    selecting at least one candidate carrier among the multiple carriers, where for each of the at least one candidate carrier, the candidate carrier has a CBR value below a CBR threshold which is configured for the candidate carrier;
    based on the number of carriers to be selected being larger than the number of the at least one candidate carrier, selecting at least one additional carrier among the multiple carriers in an increasing order of the CBR value from a lowest CBR value of the at least one additional carrier, where for each of the at least one additional carrier, the additional carrier has a CBR value above a CBR threshold which is configured for the additional carrier;
    selecting a sidelink resource on the selected at least one candidate carrier and the at least one additional carrier; and
    transmitting a medium access control (MAC) packet data unit (PDU) based on the sidelink resource.

10. The processing apparatus of claim 9, wherein the MAC PDU is related to sidelink transmission.

11. The processing apparatus of claim 9, wherein the CBR value is measured by the processing apparatus and/or is received from a network.

* * * * *